United States Patent
Bai et al.

(10) Patent No.: US 7,701,737 B2
(45) Date of Patent: Apr. 20, 2010

(54) DC-AC CONVERTER

(75) Inventors: Shwang-Shi Bai, Tainan County (TW); Hsiu-Na Hsieh, Tainan County (TW); Shu-Ming Chang, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 233 days.

(21) Appl. No.: 12/055,974

(22) Filed: Mar. 26, 2008

(65) Prior Publication Data
US 2009/0244946 A1   Oct. 1, 2009

(51) Int. Cl.
*H02M 7/48* (2007.01)
(52) U.S. Cl. .......................................... 363/97; 363/131
(58) Field of Classification Search ................... 363/20, 363/21.01, 21.04, 21.09, 21.1, 21.11, 21.12, 363/21.17, 21.18, 95, 97, 131
See application file for complete search history.

(56) References Cited

U.S. PATENT DOCUMENTS 6,583,994 B2 *  6/2003  Clayton et al. ........... 363/21.18
7,019,988 B2 *  3/2006  Fung et al. ................ 363/21.01
7,193,867 B2 *  3/2007  Aso ............................. 363/24

* cited by examiner

*Primary Examiner*—Gary L Laxton
(74) *Attorney, Agent, or Firm*—J.C. Patents

(57) ABSTRACT

A DC-AC converter includes a signal generating module, a first switch, a first capacitor, a transformer, and a trigger signal generating module. The signal generating module generates a pulse width modulation (PWM) signal according to a trigger signal. The first switch has a control terminal receiving the PWM signal, and a first terminal and a second terminal coupled to a first terminal and a second terminal of the first capacitor respectively. The transformer has a primary winding coupled to the second terminal of the first switch, and a secondary winding coupled to a load. The transformer generates a driving signal to the load according to a signal variation of the primary winding. The trigger signal generating module compares a first signal outputted from the second terminal of the first switch with a phase delay signal thereof and thereby generates the trigger signal for controlling the frequency of the PWM signal.

10 Claims, 5 Drawing Sheets

DC-AC CONVERTER

BACKGROUND OF THE INVENTION

1. Field of the Invention

The present invention relates to a DC-AC converter, and more particularly, to a converter dynamically adjusting the frequency of a pulse width modulation signal for increasing switching efficiency.

2. Description of Related Art

With great advance in the techniques of electro-optical and semiconductor devices, flat panel displays, such as liquid crystal displays (LCD), have enjoyed burgeoning development and flourished in recent year. Due to the numerous advantages of the LCD, such as low power consumption, free of radiation, and high space utilization, the LCD has become the main stream in the market. An LCD includes a liquid crystal display panel and a backlight module. The liquid crystal display panel has no capacity of emitting light by itself so that the backlight module is arranged below the liquid crystal display panel to provide the surface light source for the liquid crystal display panel so as to perform the display function.

Generally, a cold cathode fluorescent lamp (CCFL) is often used in the backlight module for providing a backlight. An inverter circuit (or called a DC-AC converter) is needed to generate a driving signal with alternating current (AC) to drive the CCFL. FIG. 1 is a circuit diagram of a conventional DC-AC converter. Referring to FIG. 1, the DC-AC converter 100 includes a switch SW1, a capacitor CA1, a pulse width modulator 110, a transformer 120 and a voltage detector 140. The conducting states (i.e. turn on state or turn off state) of the switch SW1 is controlled by a pulse width modulation (PWM) signal P1. With the change of the conducting states, the capacitor CA1 is charged or discharged via a current path provided by a primary winding of the transformer 120. A secondary winding of the transformer 120 induces a current variation of the primary winding and generates an AC voltage to drive the CCFL 130. Since the luminance of the CCFL 130 is determined according to the amount of current flowing through the CCFL 130, the voltage detector 140 detects a current flowing through the CCFL 130 and converts that current signal into a voltage signal as a feedback signal fb.

When the DC-AC converter 100 operates with a fixed power supply voltage VCC, the pulse width modulator 110 can adjust the frequency of the PWM signal P1 for achieving optimal switching efficiency. Nevertheless, a variation of the power supply voltage VCC, e.g. the power supply voltage VCC becomes higher or lower, may influence the switching efficiency of the switch SW1 if the frequency of the PWM signal P1 is kept invariable. That is to say, the switching efficiency of the switch SW1 gets worse and thereby the power consumption of the DC-AC converter 100 increases. Nowadays, in the design of the backlight module, the factories and stores attempt to solve the said problem for increase the switching efficiency of the DC-AC converter effectively.

SUMMARY OF THE INVENTION

Accordingly, the present invention is a DC-AC converter that tracks a slope polarity of one terminal signal of the switch and thereby adjusts the frequency of the pulse width modulation signal to control the conducting states of the switch. Therefore, not only can the DC-AC converter operate with a wide range voltage, but also the switching efficiency of the DC-AC converter can increase efficiently and the power consumption of the DC-AC converter can be reduced.

A DC-AC converter is provided in the present invention. The DC-AC converter includes a signal generating module, a first switch, a first capacitor, a transformer and a trigger signal generating module. The signal generating module generates a pulse width modulation signal (PWM) according to a trigger signal. The first switch has a control terminal receiving the PWM signal for controlling whether the first switch is conducted or not. The first switch has a first terminal and a second terminal respectively coupled to a first terminal and a second terminal of the first capacitor. The first terminal of the first switch is also coupled to a first voltage. The transformer has a primary winding coupled to a second voltage and the second terminal of the first switch and has a secondary winding coupled to a load and the first voltage. The transformer generates a driving signal to the load according to a signal variation of the primary winding thereof. The trigger signal generating module is coupled between the second terminal of the first switch and the signal generating module. The trigger signal generating module compares a first signal outputted from the second terminal of the first switch with a phase delay signal thereof and thereby generates the trigger signal to control the frequency of the PWM signal.

The present invention provides a DC-AC converter that utilizes a trigger signal generating module to compare one terminal signal (i.e. the first signal) of the first switch with a phase delay signal thereof for tracking the slope polarity of the first signal and thereby generating the trigger signal to control the frequency of the PWM signal for achieving higher switching efficiency and making the DC-AC converter operate with a wide range voltage (i.e. the first voltage).

In order to make the features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2:
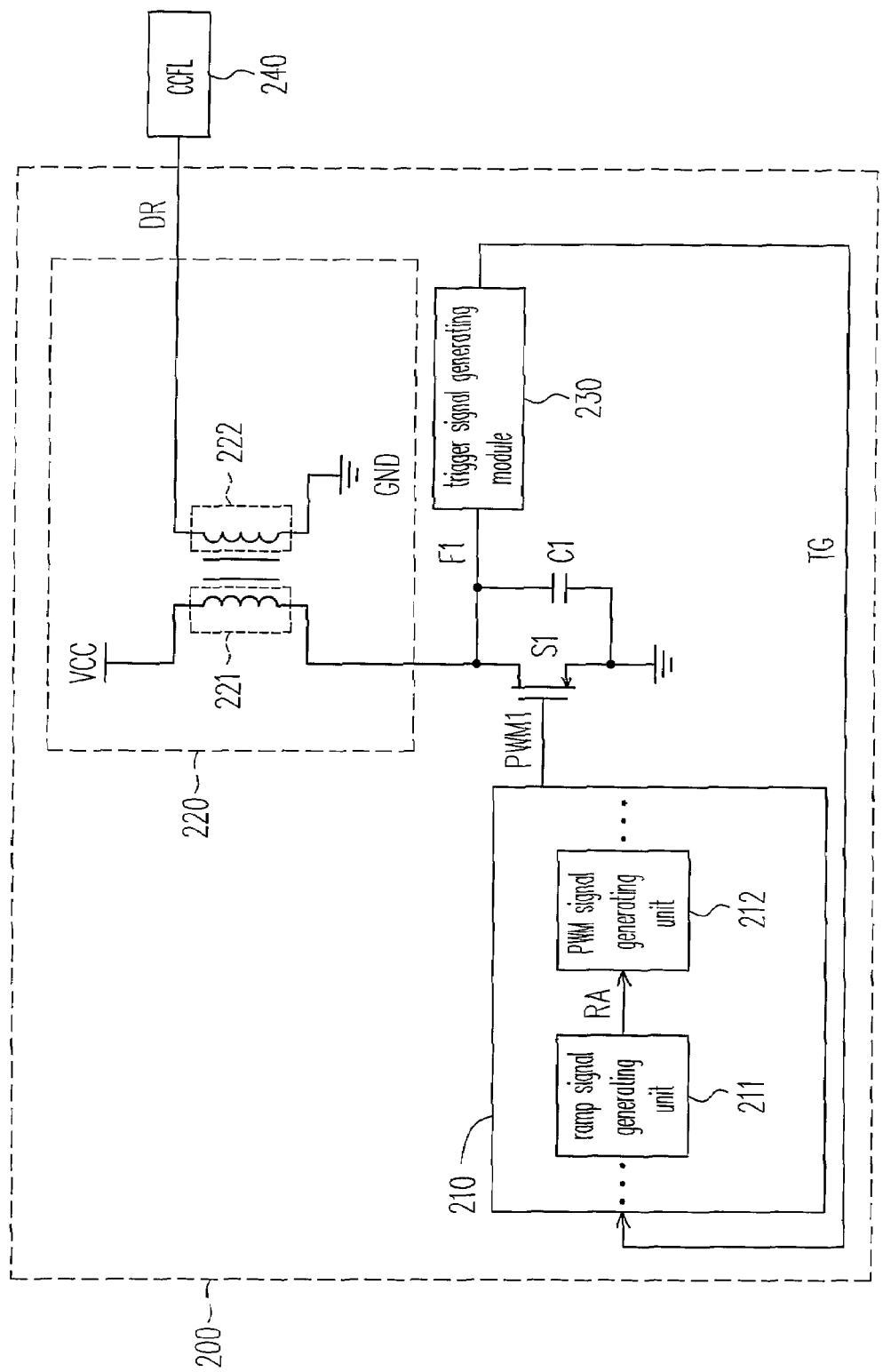
FIG. 2 is a circuit diagram of a DC-AC converter according to an embodiment of the present invention.

FIG. 2 is a circuit diagram of a DC-AC converter according to an embodiment of the present invention. Referring to FIG. 2, the DC-AC converter 200 includes a signal generating module 210, a switch S1, a capacitor C1, a transformer 220 and a trigger signal generating module 230, wherein the switch S1, for example, is a transistor or other semiconductor switching device in the embodiment. It is assumed that the DC-AC converter 200 is applied to drive a cold cathode fluorescent lamp (CCFL) 240 for providing a backlight to a display panel, but the invention is not limited in the embodiment. Referring to FIG. 2, the signal generating module 210 generates a pulse width modulation (PWM) signal PWM1 according to a trigger signal TG generated by the trigger signal generating module 230 for controlling whether the switch S1 is conducted or not. The switch S1 has a control terminal receiving the PWM signal PWM1, a first terminal coupled to a first terminal of the capacitor C1 and a second terminal coupled to a second terminal of the capacitor C1. Besides, the first terminal of the switch S1 is also coupled to a ground voltage GND.

The transformer 220 has a primary winding 221 coupled to a DC voltage VCC and the second terminal of the switch S1. The transformer 220 has a secondary winding 222 coupled to the CCFL 240 and the ground voltage GND. The secondary winding 222 of the transformer 220 generates a driving signal DR to the CCFL 240 according to a signal variation of the primary winding 221 of the transformer 220. The trigger signal generating module 230 is coupled between the second terminal of the switch S1 and the signal generating module 210. The trigger signal generating module 230 compares a first signal F1, which is outputting from the second terminal of the switch S1, with a phase delay signal thereof (not illustrated in FIG. 2) and generates the trigger signal to control the frequency of the PWM signal PWM1.

Referring to FIG. 2, the capacitor C1 is charged or discharged in accordance with the conducting states of the switch S1, i.e. turn on state or turn off state. It is assumed that the switch S1 is implemented by an N-type transistor in the embodiment. When the PWM signal PWM1 has logic low level, the switch S1 is not conducted and the capacitor C1 is charged via the current path provided by the primary winding 221 of the transformer 220. When the PWM signal PWM1 has logic high level, the switch S1 is conducted and the capacitor C1 is discharged via the conducted switch S1. The secondary winding 222 of the transformer 220 can induce an alternating current variation of the primary winding 221 of the transformer 220, and converts the DC voltage VCC to an AC voltage signal, i.e. the driving signal DR, for driving the CCFL 240.

The signal generating module 210 includes a ramp signal generating unit 211 and a PWM signal generating unit 212. The ramp signal generating unit 221 can be implemented by simple RC parallel connected circuit for generating a ramp signal RA according to the trigger signal TG. The PWM signal generating unit 212 generates the PWM signal PWM1 according to the ramp signal RA. People ordinary skilled in the art have well known that the PWM signal PWM1 is generated according to the ramp signal RA and the frequency of the PWM signal PWM1 is also controlled by the frequency of the ramp signal RA so that the detail herein is not reiterated. In the embodiment, the frequency of the PWM signal PWM1 can be adjusted by the trigger signal generating module 230 and it will be described later.

Figure 3:
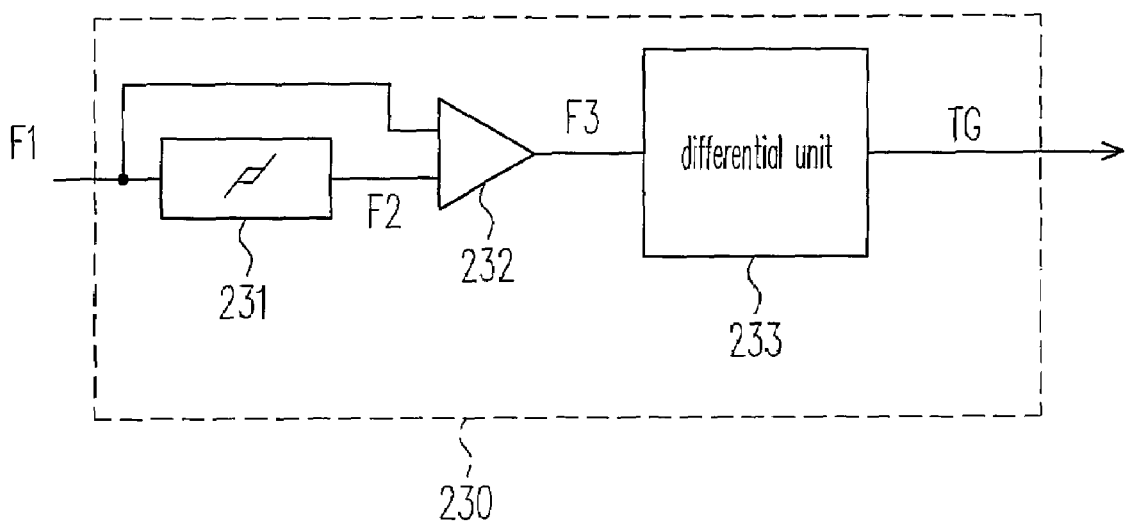
FIG. 3 is a curve diagram of the signal generating module according to an embodiment of the present invention.
Figure 4A:
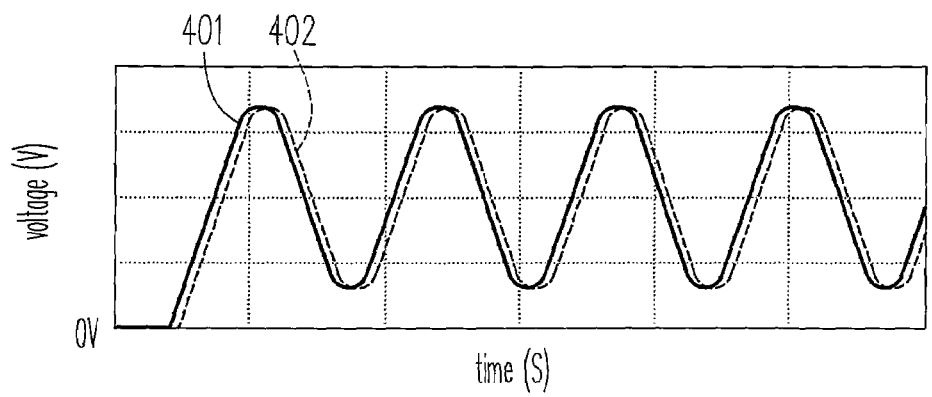
FIG. 4A is a curve diagram of the first signal and the phase delay signal according to the embodiment in FIG. 2.

FIG. 3 is a circuit diagram of the trigger signal generating module 230 according to the embodiment in FIG. 2. Referring to FIG. 3, the trigger signal generating module 230 includes a delay unit 231, a comparator 232, and a differential unit 233. The delay unit 231 is coupled to the second terminal of the switch S1. The delay unit 231 delays the first signal F1 and thereby generates the phase delay signal F2. FIG. 4A is a curve diagram of the first signal F1 and the phase delay signal F2 according to the embodiment in FIG. 2. Referring to FIG. 4A, the curves 401 and 402 are the first signal F1 and the phase delay signal F2 respectively. According to the above-mentioned description, the capacitor C1 in FIG. 2 is charged or discharged according to the conducting states of the switch S1 thus the first signal F1 (i.e. the curve 401) outputted from the second terminal of the switch is an AC signal. The phase delay signal F2 (i.e. the curve 402) is generated from the delay unit 232 by delaying the first signal F1. In the embodiment, the delay unit 231 can be implemented by a backlash phase delay circuit.

Figure 4B:
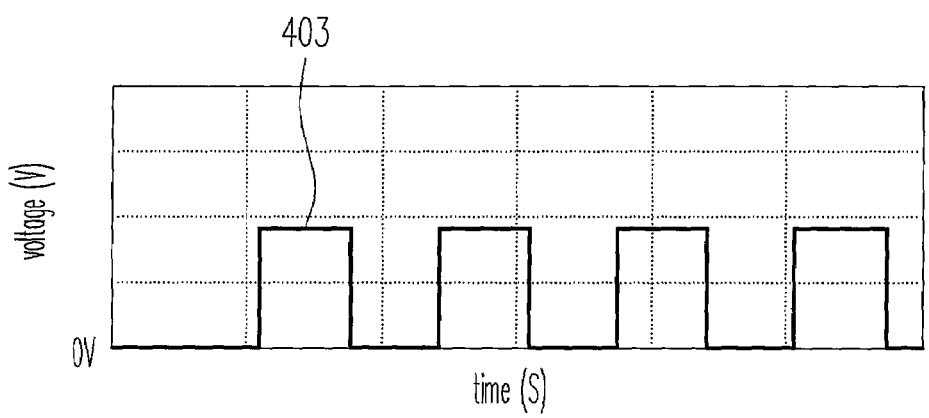
FIG. 4B is a curve diagram of the square wave signal according to the embodiment in FIG. 3.

The comparator 232 has a first input terminal and a second input terminal receiving the first signal F1 and the phase delay signal F2 respectively, and the comparator 232 has an output terminal generating a square wave signal F3. FIG. 4B is a curve diagram of the square wave signal F3 according to the embodiment in FIG. 3. The curve 403 is the square wave signal F3. Referring to FIG. 4A and FIG. 4B, the comparator 232 compares the phase delay signal F2 with the first signal F1 and thereby generates the square wave signal F3. In the embodiment, when a voltage of the phase delay signal F2 is greater than the voltage of the first signal F1, the square wave signal F3 outputted form the comparator 232 has logic high level. When the voltage of the phase delay signal F2 is smaller than the voltage of the first signal F1, the square wave signal F3 outputted from the comparator 232 has logic low level. Hence, the comparator 232 can detect the wave crest and the wave trough of the first signal F1 by well controlling a delay time of the delay unit 231.

Figure 4C:
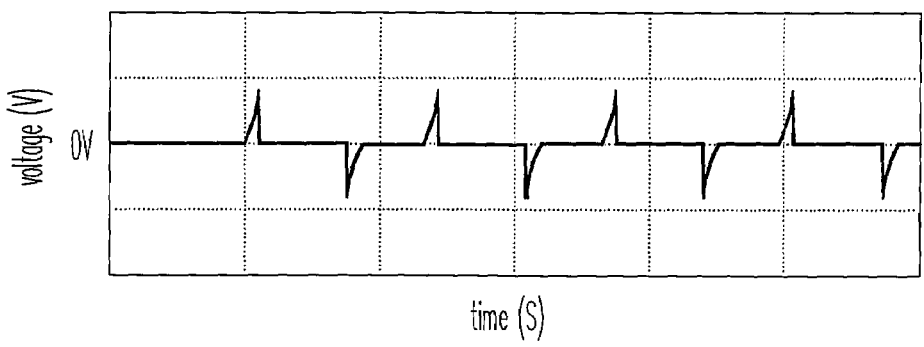
FIG. 4C is a voltage curve diagram of the trigger signal TG according to the embodiment in FIG. 3.

Referring to FIG. 2 and FIG. 3, the differential unit 233 is coupled between the output terminal of the comparator 232 and the signal generating module 210. The differential unit 233 differentiates the square wave signal F3 and thereby generates the trigger signal TG. FIG. 4C is a voltage curve diagram of the trigger signal TG according to the embodiment in FIG. 3. Referring to FIG. 4B and FIG. 4C, when a rising edge of the square wave signal F3 occurs, i.e. the wave crest of the first signal F1, the trigger signal TG generated by the differential unit 233 has positive voltage pulse. When a falling edge of the square wave signal F3 occurs, i.e. the wave trough of the first signal F1, the trigger signal TG generated by the differential unit 233 has negative voltage pulse. In the embodiment, the trigger signal TG can be seen as a signal indicating the wave crest and the wave trough of the first signal F1. The trigger signal TG is feedback to the signal generating module 210 for adjusting the frequency of the ramp signal RA and the frequency of the PWM signal PWM1 so as to further adjust the switching efficiency.

Figure 5:
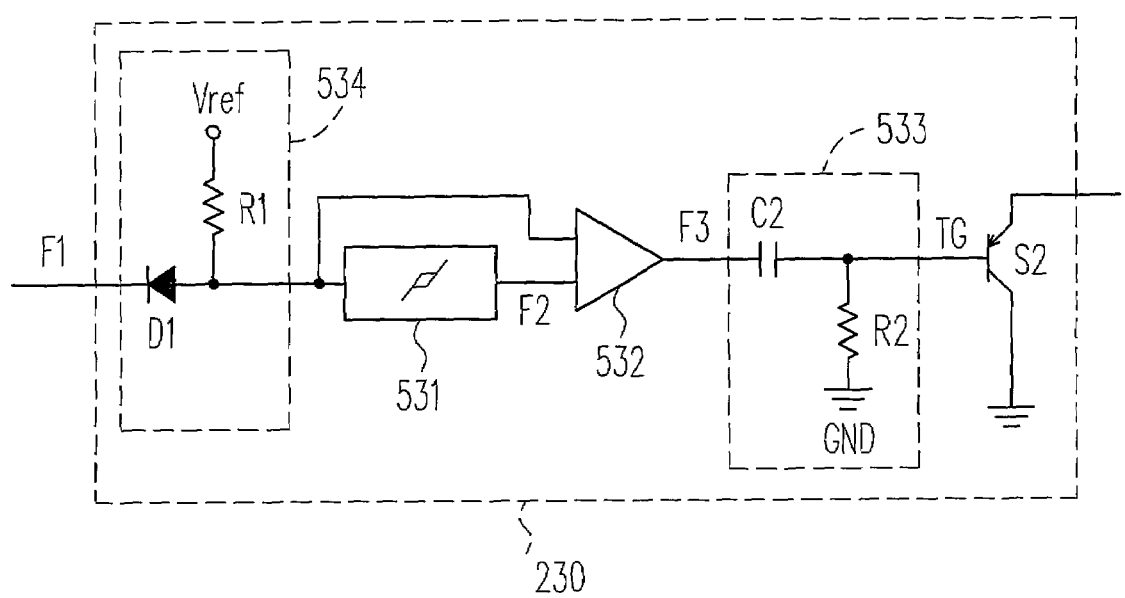
FIG. 5 is a circuit diagram of the trigger signal generating module according to the embodiment in FIG. 2.

For making the people ordinary skilled in the art easily practice the embodiment of the present invention, there is another embodiment described following. FIG. 5 is a circuit diagram of the trigger signal generating module 230 according to the embodiment in FIG. 2. Referring to FIG. 5, the trigger signal generating module 230 includes a delay unit 531, a comparator 532, a differential unit 533, a switch S2 and a clipper unit 534. Since a voltage of the first signal F1 may achieve a high voltage, e.g. the DC voltage VCC, the clipper unit 534 composed of the diode D1 and a resistor R1 is utilized to clip the first signal F1 under a reference voltage Vref and transmits the first signal F1 to the delay unit 531 and the first input terminal of the comparator 532. The diode D1 has a cathode coupled to the second terminal of the first switch S1 for receiving the first signal F1 and the diode D1 has an anode coupled to the delay unit 531. The resistor R1 has a first terminal and a second terminal respectively coupled to the reference voltage Vref and the anode of the diode D1. The clipper unit 534 can avoid the voltage of the first signal F1 being over than an upper limit of the reference voltage Vref.

The delay unit 531 and the comparator 532 are used for detecting the wave crest and the wave trough of the first signal F1 and the operation of them are same as the embodiment in FIG. 3 so that the detail is not reiterated. The differential unit 533 includes a capacitor C2 and a resistor R2 for differentiating the square wave signal F3 and generating the trigger signal TG. The capacitor C2 has a first terminal coupled to the output terminal of the comparator 532 and a second terminal outputting the trigger signal TG. The resistor R2 has a first terminal coupled to the second terminal of the capacitor C2 and a second terminal coupled to the ground voltage GND. In the embodiment, the switch S2 is implemented by a PNP bipolar junction transistor (BJT), but the invention is not limited in the embodiment. The base, emitter and collector of the PNP BJT are respectively a control terminal, a first terminal and a second terminal of the switch S2. The control terminal of the switch S2 receives the trigger signal TG. The first terminal and the second terminal of the switch S2 are coupled to the signal generating module 210 and the ground voltage GND. The following gives an example for adjusting the frequency of the ramp signal RA according to the trigger signal TG.

As the foregoing description in FIG. 2, the ramp signal generating unit 211 can be implemented by a RC parallel connected circuit. Referring to FIG. 4A and FIG. 4C, when the wave trough of the first signal F1 occurs, the trigger signal TG has negative voltage pulse and the switch S2 is triggered to be turned on. In the meanwhile, the ramp signal RA is dropped to the ground voltage GND since the RC parallel connected circuit is discharged via the conducted switch S2. After the negative voltage pulse keeps very short time, the switch S2 is turned off and the ramp signal RA is increased to conduct the switch S1 since the RC parallel connected circuit is charged. In this manner, the frequency of the ramp signal RA and the frequency of the PWM signal PWM1 can be adjusted to increase the switching efficiency.

Figure 1:
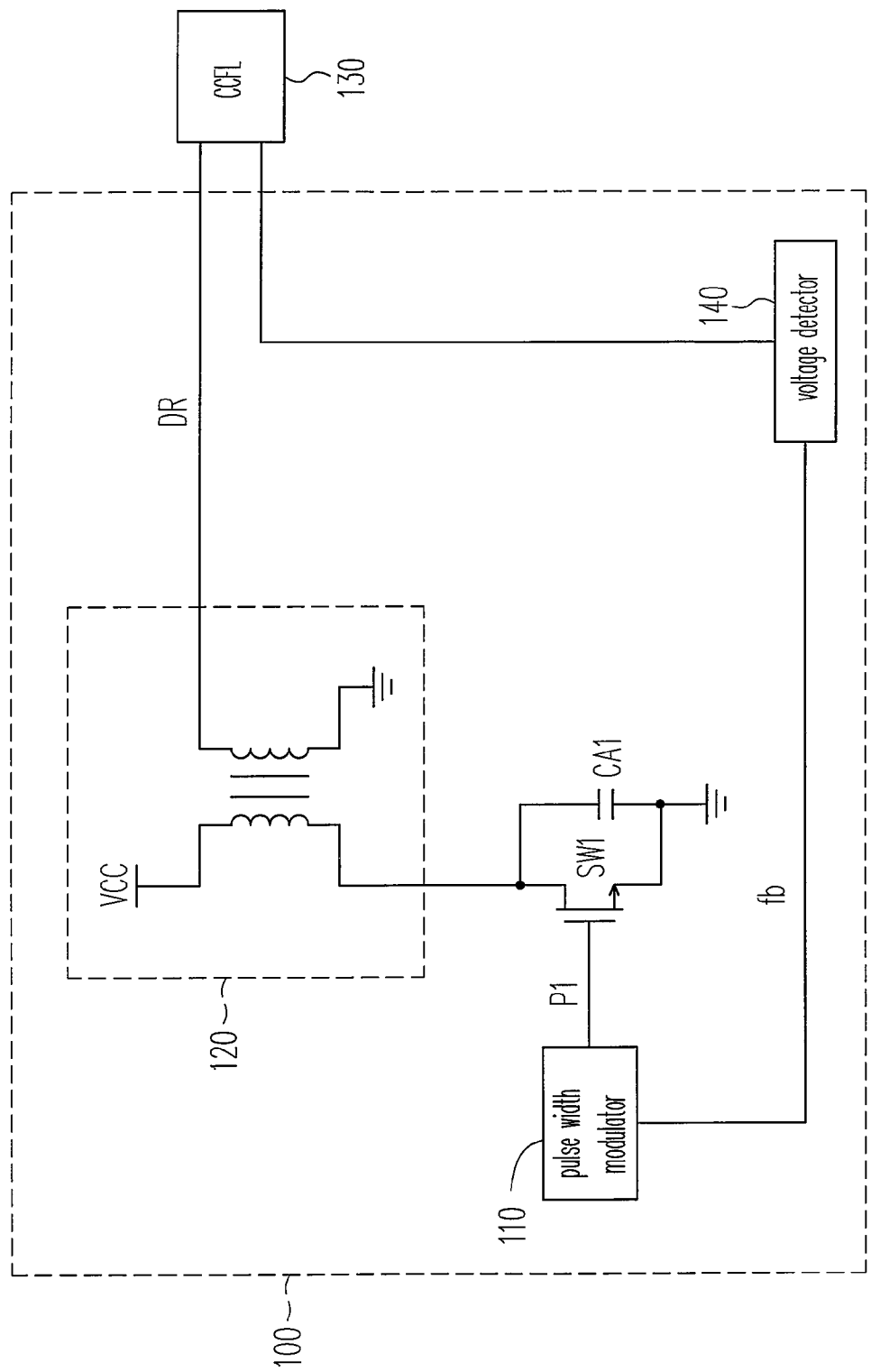
FIG. 1 is a circuit diagram of a conventional DC-AC converter.

Referring to FIG. 1, if the DC voltage VCC becomes higher, the secondary winding 222 of the transformer 220 may provide the driving signal DR with over voltage so that the additional power consumption can not be avoided. Besides, in the prior art, the pulse width of the PWM signal P1 is decided by the current flowing through the CCFL 130, i.e. the feedback signal fb, but the frequency of the PWM signal P1 is not adjusted. In the said embodiment of the present invention, the slope polarity the first signal F1 outputted from the second terminal of the switch S1 is continuously tracked. The switching efficiency of the DC-AC converter 200 can be increased by referring the trigger signal TG to adjust the frequency of the ramp signal RA, and the DC-AC converter 200 can operate with a wide range voltage.

In summary, the DC-AC converter 200 generates the driving signal DR with alternating current by controlling the conducting states of single switch S1. The trigger signal generating module 230 compares the first signal F1 outputted from the second terminal of the switch S1 with the phase delay signal F2 thereof to track the slope polarity of the first signal F1, and then generates the trigger signal TG to the signal generating module 210 for adjusting the frequency of the ramp signal RA. Therefore, the frequency of the PWM signal PWM1 is also adjusted. The switching efficiency of the DC-AC converter 200 in the said embodiment is enhanced and the power consumption problem is also improved efficiently.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A DC-AC converter, comprising:
   a signal generating module, generating a pulse width modulation signal according to a trigger signal;
   a first switch, having a control terminal receiving the pulse width modulation signal for controlling whether the first switch is conducted or not, a first terminal coupled to a first voltage, and a second terminal;
   a first capacitor, having a first terminal and a second terminal respectively coupled to the first terminal and the second terminal of the switch;
   a transformer, having a primary winding coupled to a second voltage and the second terminal of the first switch, and a secondary winding coupled to a load and the first voltage for generating a driving signal to the load according to a signal variation of the primary winding; and
   a trigger signal generating module, coupled between the second terminal of the first switch and the signal generating module for comparing a first signal outputted from the second terminal of the first switch with a phase delay signal thereof and thereby generating the trigger signal to control the frequency of the pulse width modulation signal.

2. The DC-AC converter as claimed in claim 1, wherein the trigger signal generating module comprises:
   a delay unit, coupled the second terminal of the first switch for generating the phase delay signal according to the first signal;
   a first comparator, having a first input terminal receiving the first signal, a second input terminal receiving the phase delay signal and an output terminal generating a square wave signal; and
   a differential unit, coupled between the output terminal of the comparator and the signal generating module for differentiating the square wave signal and thereby generating the trigger signal.

3. The DC-AC converter as claimed in claim 2, wherein the trigger signal generating module further comprises:
   a second switch, having a control terminal receiving the trigger signal, a first terminal coupled to the signal generating module, and a second terminal coupled to the first voltage.

4. The DC-AC converter as claimed in claim 2, wherein the trigger signal generating module further comprises:
   a clipper unit, clipping the first signal under a reference voltage and transmitting the first signal to the delay unit and the first input terminal of the first comparator.

5. The DC-AC converter as claimed in claim 4, wherein the clipper unit comprises:
   a diode, coupled between the second terminal of the first switch and the delay unit; and
   a first resistor, having a first terminal coupled to the reference voltage and a second terminal coupled to the diode.

6. The DC-AC converter as claimed in claim 2, wherein the differential unit comprises:
   a second capacitor, having a first terminal coupled to the output terminal of the comparator, and a second terminal outputting the trigger signal; and
   a second resistor, having a first terminal coupled to the second terminal of the capacitor, a second terminal coupled to the first voltage.

7. The DC-AC converter as claimed in claim 1, wherein the signal generating module comprises:

a ramp signal generating unit, generating a ramp signal according to the trigger signal.

8. The DC-AC converter as claimed in claim 7, wherein the signal generating module further comprises:

a PWM signal generating unit, generating the pulse width modulation signal according to the ramp signal.

9. The DC-AC converter as claimed in claim 1, wherein the first voltage is a ground voltage.

10. The DC-AC converter as claimed in claim 1, wherein the second voltage is a DC voltage.

* * * * *